Nov. 27, 1951    W. C. BEACH    2,576,438
SELF-LOCKING SCREW-THREADED ELEMENT
Filed May 10, 1946
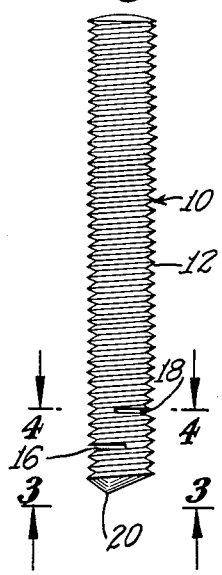
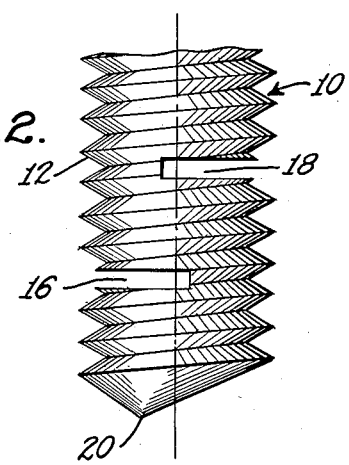
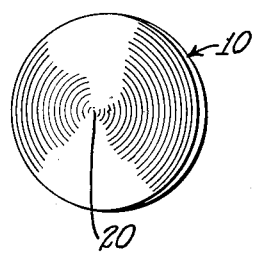
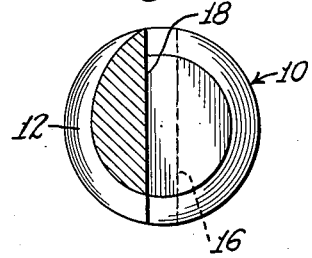
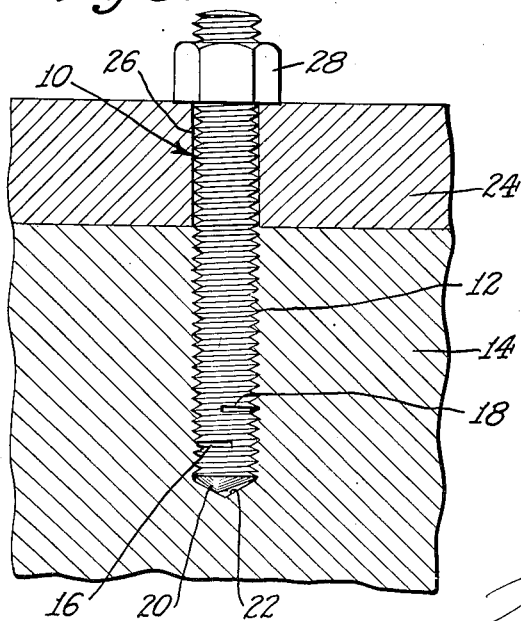
INVENTOR.
WILLARD C. BEACH
BY
James D. Bock
ATTORNEY Patented Nov. 27, 1951

2,576,438

UNITED STATES PATENT OFFICE 2,576,438

SELF-LOCKING SCREW-THREADED ELEMENT

Willard C. Beach, Montville, N. J.

Application May 10, 1946, Serial No. 668,915

3 Claims. (Cl. 151—32)

The present invention relates to a self-locking screw threaded element of the type which enters an internally threaded blind hole. Such element may take the form of a stud, machine-screw or the like, or may take any special form such as a hook, hanger, pintle or any other device which includes an externally threaded cylindrical body which it is desired to lock into an internally threaded blind hole.

The primary object of the invention is to provide a self-locking screw-threaded element in which the threaded portion adapted to be entered into an internally threaded blind hole has an uninterrupted or uniform lead and which is distorted for locking purposes only when the entering end thereof is seated against the bottom of the blind hole. The element thus may be repeatedly screwed into place and removed without damage to its threads or the threads of the blind hole, such operations being free of any unusual effort except at the time of locking.

Other and further objects in part will be obvious and in part will become apparent from the following description and the drawings forming a part of the present specification.

In the drawings:

Fig. 1 is an elevation of a stud embodying the invention;

Fig. 2 is an enlarged elevation of the entering end of the stud shown in Fig. 1;

Fig. 3 is an end elevation taken in the plane which includes the line 3—3 of Fig. 1 and looking in the direction of the arrows;

Fig. 4 is a section along the line 4—4 of Fig. 1; and

Fig. 5 shows the stud of Fig. 1 in use.

Referring now to the drawings, a preferred form of the invention is disclosed as embodied in a threaded element generally indicated at 10. For purposes of illustration the threaded element may comprise a stud of the type which is provided with a continuous external thread 12. A portion of the thread is intended to be entered into an internally threaded blind hole in a suitable body 14 (see Fig. 5) and it will be understood that the present invention relates only to such portion. Thus it is immaterial to the present invention whether the portion of the threaded element 10 extending outside a body such as 14 is provided with a continuation of the thread 12 or with a different thread or with a head, shank or other element such as a hook and the like.

The lower end of the element 10, as viewed in Fig. 1, is the entering end thereof. Adjacent the entering end there is provided one or more transverse slots such as the slots 16 and 18 shown in the drawings. If only one slot is provided it will be formed in the element 10 in the position occupied by the slot 16. If two slots are provided, the second slot will be formed in the position occupied by the slot 18. If more than two slots are provided, the third and other successive slots will enter the body of the threaded element 10 from alternate sides and will be spaced from one another in the manner illustrated in connection with the slots 16 and 18.

The slot 16 enters the body of the threaded element 10 on the lefthand side thereof as viewed in Fig. 1 and extends substantially normal to the axis of the body 10 and somewhat beyond said axis as shown, for example, in Fig. 4. The slot 16 thus cuts slightly more than halfway through the thickness of the threaded element 10. It is important that the slot extend beyond the axis but it will be realized that it cannot extend too great a distance beyond said axis without so severely weakening the threaded body as to render it impractical. It is preferred that the slot 16 extend beyond the axis a distance roughly equal to one-fourth or one-fifth of the radius of the core of the threaded body. The exact distance will be determined in some measure at least by the characteristics of the metal or other material from which the threaded element may be formed and the proportions illustrated and discussed herein have been found suitable for use in a threaded element made from iron. The slot 18 enters the body of the threaded element 10 from the side thereof opposite the open end of slot 16. Thus in Fig. 1 the slot 18 enters the threaded body 10 from the righthand side thereof. The slot 18 and any additional slots which might be provided are also extended beyond the axis of the threaded body as in the case of the slot 16.

As shown in Fig. 4, the slots 16 and 18 overlap throughout the diameter of the threaded body 10. It has been found preferable to provide the threaded element with two slots such as the slots 16 and 18, the overlapping thereof as shown in Fig. 4 making it certain that the region of the threaded element 10 adjacent such slots will be distorted by the means to be described hereinbelow to an extent to insure extremely firm locking of the threaded element in a blind hole.

The entering end of the threaded element 10 is provided with a nose 20 the apex of which is eccentrically disposed relative to the axis of the threaded body 10. The nose 20 is shown in end elevation in Fig. 3 and it will be observed that it is generally conical in shape and that the surface to the right of the apex slopes more gently toward the axis than does the surface to the left of the apex. The particular conformation of the nose is not of critical importance to the present invention but it is important that a relatively sharp apex be provided and that this apex be positioned in vertical alignment with substantially the mid-point in the depth of the slot 16. Thus pressure exerted upon the nose 20 will tend to cant the portion of the threaded body extending downwardly of the slot 16 and thus will tend to close the slot 16.

When the threaded element 10 is entered into an internally threaded blind hole as illustrated in the body 14 (Fig. 5), the uniform and uninterrupted pitch of the threads will permit the body to be easily turned and brought substantially to the bottom of the hole. In such operation no undue resistance will be met nor will any damage be done to the threads on the element 10 or within the blind hole. When the nose 20 impinges upon the bottom 22 of the blind hole and continued turning effort is applied to the threaded element 10, a relatively heavy pressure will be exerted between the nose 20 and the bottom 22. The forces set up upon impingement will be such as to tend to close the slot 16 and thus to throw the threads on the extreme end of the element 10 out of alignment with the remaining threads thereon. This action will bring about a very effective locking engagement between the body element 10 and the body 14.

A single slot such as 16 will bring about a locking action entirely satisfactory for many purposes. However, a much more effective locking action is achieved if two slots are provided. In some instances it is desirable to provide more than two slots although the increased locking efficiency thus achieved is not so marked as the increase achieved in providing two slots. When two slots are provided, the pressure exerted between the nose 20 and the bottom 22 of the blind hole will tend not only to close the slot 16 but also to close the slot 18 inasmuch as downward movement of the element 10 as it is turned is resisted first by the nose 20 impinging upon the bottom 22 which results in partially closing the slot 16, and, second, by the uncut portion of the element 10 extending vertically below the slot 18.

It has been found particularly important to provide an adequate extent of thread between the entering end of the element 10 and the slot 16 as well as between the slot 16 and the slot 18. Obviously, if too little metal is left, the device will be structurally weak and furthermore, there will not be sufficient thread to bring about an effective locking action. It has been found that about two full turns of thread must be left beyond the slot 16 and between the slot 16 and the slot 18. If substantially more than two full turns is left in either of these portions, the device will be too stiff and will not be likely to lock without undue effort, and it may be extremely difficult to remove the threaded element if it might be desired to do so. If two full turns of thread are left in the portions indicated, it will be found that effective locking will occur without undue effort and it will be found that the threaded element 10 may be removed from the body 14 by applying a moderate turning force for a short time after which the nose 20 will be removed from contact with the bottom 22. When this occurs, the element 10 may be removed from the body 14 without any difficulty inasmuch as the distortion incident to locking is almost wholly temporary.

The operation of locking the threaded element 10 in a blind hole is independent of the particular shape of the bottom of such hole. In general, such holes will have a conical bottom resulting from the conformation of a drill and for this reason a conical bottom 22 has been illustrated herein. However, it is apparent that the nose 20 will operate with equal effectiveness when brought into contact with a flat surface or any other shape of surface ordinarily existing at the bottom of a blind hole.

In Fig. 5 the threaded element 10 has been shown turned into the body 14 and locked therein by bringing the nose 20 into engagement with the bottom 22. The slots 16 and 18 have been shown as partially closed and as a result of such closing, the portion of the threaded element in the region of the slots 16 and 18 has been distorted into such shape as to lock the element 10 in the body 14. The threaded element 10 has been shown as a stud and to illustrate one use of such a stud there is shown a second body 24 secured against the body 14. The body 24 is provided with a smooth hole 26 through which the stud 10 projects and a nut or other suitable fastening device is shown threaded upon the free end of the stud 10.

The above detailed disclosure of preferred forms of the invention and the disclosure of a specific embodiment thereof is for the purpose of complying with the patent statutes, and it will be understood that modifications and variations may be resorted to by those skilled in the art without departing from the scope of the appended claims.

I claim:

1. A self-locking screw-threaded element having a screw-threaded portion adapted to be entered into an internally threaded blind hole, said threaded portion having a uniform lead and having adjacent the entering end thereof a plurality of slots extending transversely of the axis of rotation of said threaded portion, each slot entering said threaded portion on one side of said axis and extending from said side across and beyond said axis and said slots overlapping substantially throughout the diameter of said element, there being at least one complete turn of thread between the entering end of said element and the slot nearest said end and between adjacent slots, and a nose formed on the entering end of said element the apex of said nose being eccentrically disposed relative to said axis and positioned on the side thereof from which the slot nearest said end enters said element, said nose being adapted to impinge upon the bottom of said blind hole to cause distortion of said threaded portion in the region of said slots.

2. A self-locking screw-threaded element having a screw-threaded portion adapted to be entered into an internally threaded blind hole, said threaded portion having a uniform lead and having adjacent the end thereof a plurality of slots extending transversely of the axis of rotation of said threaded portion, each slot entering said threaded portion on one side of said axis and extending from said side across and beyond said axis and said slots overlapping substantially throughout the diameter of said element, there being substantially two turns of thread between the entering end of said element and the slot nearest said end and between adjacent slots, and a nose on the entering end of said element, said nose being eccentrically disposed relative to said axis and positioned on the side thereof from which the slot nearest said end enters said element, said nose being adapted to impinge upon the bottom of said blind hole to cause distortion of said threaded portion in the region of said slots.

3. A self-locking screw-threaded element having a screw-threaded portion adapted to be entered into an internally threaded blind hole, said threaded portion having a uniform lead and having adjacent the end thereof a plurality of slots extending transversely of the axis of rotation of said threaded portion, each slot entering said threaded portion on one side of said axis and extending from said side across and beyond said axis and said slots overlapping substantially throughout the diameter of said element, there being substantially two turns of thread between the entering end of said element and the slot nearest said end and between adjacent slots, and a nose on the entering end of said element, said nose being eccentrically disposed relative to said axis and being so positioned in relation to the slot nearest said end as to cause distortion of said threaded portion in the region of said slots when said nose impinges upon the bottom of said blind hole.

WILLARD C. BEACH.

REFERENCES CITED

The following references are of record in the file of this patent:

UNITED STATES PATENTS

| Number    | Name      | Date          |
|-----------|-----------|---------------|
| 1,861,833 | Bergstrom | June 7, 1932  |
| 2,007,171 | Bergstrom | July 9, 1935  |
| 2,224,659 | Stoll     | Dec. 10, 1940 |
| 2,243,515 | Van Sant  | May 27, 1941  |
| 2,386,897 | Johnson   | Oct. 16, 1945 |